US007886861B2

(12) United States Patent
Nozaki et al.

(10) Patent No.: US 7,886,861 B2
(45) Date of Patent: Feb. 15, 2011

(54) ELECTRIC VEHICLE

(75) Inventors: Takuma Nozaki, Obu (JP); Atsushi Takeda, Okazaki (JP); Toshiaki Isogai, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/529,815

(22) PCT Filed: Mar. 13, 2008

(86) PCT No.: PCT/JP2008/054578

§ 371 (c)(1),
(2), (4) Date: Sep. 3, 2009

(87) PCT Pub. No.: WO2009/031331

PCT Pub. Date: Mar. 12, 2009

(65) Prior Publication Data

US 2010/0101885 A1   Apr. 29, 2010

(30) Foreign Application Priority Data

Sep. 6, 2007 (JP) ............................. 2007-231544
Sep. 6, 2007 (JP) ............................. 2007-231545

(51) Int. Cl.
*B60K 5/00* (2006.01)
*B60D 27/00* (2006.01)

(52) U.S. Cl. ...................... 180/232; 180/312; 280/783; 280/784

(58) Field of Classification Search .................. 180/232, 180/312, 907; 280/783, 784
See application file for complete search history.

(56) References Cited

U.S. PATENT DOCUMENTS 5,343,973 A * 9/1994 Lanker ....................... 180/211

(Continued)

FOREIGN PATENT DOCUMENTS

JP            8-310252 A      11/1996

(Continued)

*Primary Examiner*—Toan C To
(74) *Attorney, Agent, or Firm*—Birch, Stewart, Kolasch & Birch, LLP

(57) ABSTRACT

An electric vehicle has a first bracket (23) that supports a battery unit (10)-side end of a power unit (16) and extends in a width direction of the vehicle. The first bracket (23) is coupled to a vehicle body through a first coupling section (26) formed in one end of the first bracket (23) and a second coupling section (26) formed in the other end, and the power unit (16) is coupled to the first bracket (23) through at least two inner coupling sections (24) that are located more inside than the first and second coupling sections (26) as considered in the width direction of the vehicle. A first fragile portion (48) is formed between the first coupling section (26) and the inner coupling section (24) closest to the first coupling section (26), and between the second coupling section (26) and the inner coupling section (24) closest to the second coupling section (26). The first fragile portion (48) is broken by a smaller impact load at the time of collision with the side where the power unit (16) is installed than at the time of collision with the side where the power unit (16) is not installed.

14 Claims, 16 Drawing Sheets

U.S. PATENT DOCUMENTS

| | | | |
|---|---|---|---|
| 5,915,494 A * | 6/1999 | Matsumura et al. | 180/232 |
| 5,921,578 A * | 7/1999 | Sekita et al. | 280/788 |
| 7,021,412 B2 * | 4/2006 | Koike et al. | 180/68.5 |
| 7,051,825 B2 * | 5/2006 | Masui et al. | 180/68.5 |
| 7,144,039 B2 * | 12/2006 | Kawasaki et al. | 280/784 |
| 7,393,016 B2 * | 7/2008 | Mitsui et al. | 280/784 |
| 7,562,886 B2 * | 7/2009 | Takeda et al. | 280/124.109 |
| 7,690,686 B2 * | 4/2010 | Hashimura et al. | 280/782 |
| 2003/0089540 A1 * | 5/2003 | Koike et al. | 180/68.5 |
| 2007/0289792 A1 * | 12/2007 | Bataille et al. | 180/89.17 |
| 2008/0257632 A1 * | 10/2008 | Takeshima et al. | 180/312 |

FOREIGN PATENT DOCUMENTS

JP  2006-88871 A  4/2006

* cited by examiner

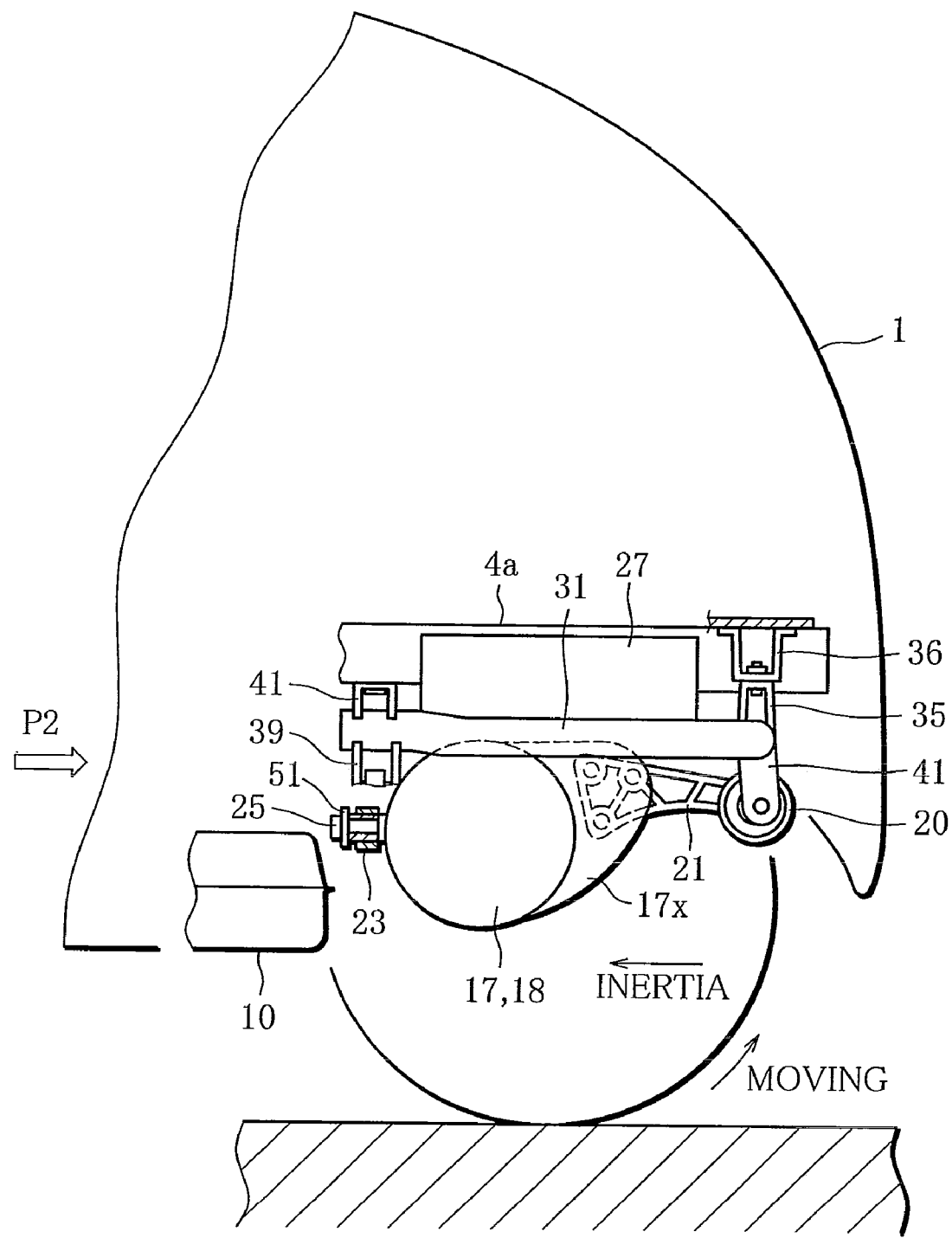

ELECTRIC VEHICLE

TECHNICAL FIELD

The present invention relates to an electric vehicle equipped with a power unit and a battery unit.

BACKGROUND ART

For reliability improvement, cost reduction, and reduction of development time, an electric vehicle may be equipped with a power unit constructed of an electric motor and other parts and a battery unit serving as a power source, using a vehicle body of the vehicle which is designed to be equipped with an internal combustion engine. More specifically, an engine room that is formed on one end side of the vehicle body as considered in a longitudinal direction of the vehicle body is utilized without change as a power unit room for installing the power unit. The battery unit is set under the floor of a passenger compartment situated in the center of the vehicle body.

In general, the power unit of an electric vehicle is supported onto the frame of the power unit room by means of a first bracket protruding sideways from the battery unit-side end of the power unit and a second bracket protruding sideways from the opposite end of the power unit, as disclosed in Unexamined Japanese Patent Publication No. 8-310252 (hereinafter, referred to as Patent Document 1). To be more concrete, both ends of the first bracket and those of the second bracket are supported onto the frame of the power unit room, and the first and second brackets support the power unit at their more internal positions than their ends.

In the case of an electric vehicle of this type, it is easy to secure a space for installing devices in the central region and ends of the vehicle body as described above. For a reason related to construction, therefore, the power unit and the batter unit are likely to be installed alongside of each other in the vehicle body. The mileage of the electric vehicle is determined considerably by electric capacity of the battery installed, so that there is a demand to install as large a battery as possible. It is then difficult to save a wide space between the power and battery units that are adjacently arranged in the vehicle body.

If the electric vehicle crashes on the side where the power unit is installed (first side), and an impact load is entered from the first side of the vehicle body, only the vehicle body is forcibly displaced, leaving the power unit behind, in the direction of the battery unit that is positioned closer to the center of the vehicle body than the power unit is. In result, the power unit is pushed out towards the battery unit since it is supported onto the vehicle body by the first and second brackets. However, as the space between the power and battery units is small, if the power unit is pushed out without resistance along with the displacement of the vehicle body, the power unit smashes against the end of the battery unit, and the battery unit might be damaged.

At this time point, the stress produced by relative displacement between the vehicle body and the power unit is concentrated in the first and second brackets at their central regions, the spans of which are relatively large. In case that the first and second brackets are broken at their central regions, a force causing the relative displacement of the power unit towards the battery unit is suppressed.

The broken first and second brackets, however, are still connected to the power unit. For this reason, especially as to the first bracket located on the battery unit side, a sharp fractured part of the bracket portion that has been broken at the central region might hit against the end of the battery unit and damage the battery unit.

In the field of vehicles, one possible idea to deal with the above situation is to form a fragile portion in the first bracket so that the battery unit-side bracket is broken at a certain position. In the case of the electric vehicle, however, simply forming the fragile portion is no guarantee that the battery unit will be protected from the damage described above.

This is because the impact-related behavior of the electric vehicle on the side where the power unit is not installed (second side) is different from that on the side where the power unit is installed (first side). In contrast to the situation where an impact is applied to the first side, if an impact load is entered from the second side of the vehicle body due to a collision with the second side, the power unit is forcibly displaced in the direction of the battery unit due to inertia of the power unit. The first bracket in this situation, unlike the situation where the impact is applied, to the first side, is required to avoid a breakage in the bracket as much as possible and to prohibit a relative approach of the power unit to the battery unit.

However, the first bracket rather becomes easily broken even at the time of collision with the second side where the power unit is not installed, if the fragile portion is merely formed in the first bracket. Consequently, at the time of collision with the second side where the power unit is not installed, the power unit is likely to hit against and damage the battery unit.

DISCLOSURE OF THE INVENTION

The present invention has been made in light of the above-mentioned problem. It is an object of the invention to provide an electric vehicle capable of restraining a damage of a battery unit in either case of a collision with a side where a power unit is installed or a collision with a side where the power unit is not installed.

In order to achieve the object, the electric vehicle of the invention comprises a power unit that is disposed on a first side of a vehicle body, which is one end side of the vehicle as considered in a longitudinal direction of the vehicle, supported onto the vehicle body by using a plurality of brackets, and drives the vehicle; and a battery unit that is disposed on a center side of the vehicle body as considered in the longitudinal direction of the vehicle, adjacently to the power unit, and serves as a power source of the vehicle, wherein the plurality of brackets includes a first bracket that supports a battery unit-side end of the power unit; the first bracket extends in a width direction of the vehicle, and is coupled to the vehicle body through a first coupling section arranged to one end of the first bracket and a second coupling section arranged to the other end of the first bracket; the power unit is coupled to the first bracket through at least two inner coupling sections that are located more inside than the first and second coupling sections as considered in the width direction of the vehicle; the first bracket has a first fragile portion, which is broken by being applied with an impact load exceeding a given level at the time of collision in the longitudinal direction of the vehicle, between the first coupling section and the inner coupling section closest to the first coupling section, and between the second coupling section and the inner coupling section closest to the second coupling section; and the first fragile portion is formed to be broken by a smaller impact load at the time of collision with the first side than at the time of collision with a second side that is opposite to the first side as considered in the longitudinal direction of the vehicle.

Let us assume that, in the electric vehicle thus constructed, an impact load is applied on the first side of the vehicle body due to a collision with the first side where the power unit is installed. In this case, the first fragile portion of the first bracket is provided with a property of being easily broken by an impact load applied from the first side of the vehicle body. The first bracket is then broken at between the first coupling section and the inner coupling section closest to the first coupling section and at between the second coupling section and the inner coupling section closest to the second coupling section, to thereby restrain an action causing a relative displacement of the power unit towards the battery unit. The first bracket is accordingly divided into three by the breakages of these two first fragile portions. In result, there only remains a short bracket portion on the vehicle-body side, which has been released from the support of the power unit. This decreases the possibility of a collision between the battery unit and a broken portion of the bracket portion that remains on the vehicle-body side.

Let us assume that an impact load is applied onto the second side of the vehicle body due to a collision with the side where the power unit is not installed, that is, on the second side that is opposite to the first side as considered in the longitudinal direction of the vehicle. In this case, the first fragile portion of the first bracket is provided with a property of being not easily broken by an impact load applied from the second side of the vehicle body. The first bracket is then not easily broken, which restrain displacement of the power unit towards the battery unit. This makes it possible to avoid a destructive collision between the power unit and the battery unit.

In either case of a collision with the side where power unit is installed or a collision with the side where the power unit is not installed, damage of the battery unit can be restrained. Such an advantage can be accomplished by providing the first bracket with the first fragile portion differentiated in breakage property. The advantage is particularly useful in an electric vehicle where a large space cannot be secured between a battery unit and a power unit.

To be specific, the first fragile portion may be a recessed area formed in a lateral face of the first bracket, which faces towards the power unit, so as to expand in a vertical direction.

Preferably, the first bracket may have a projecting portion protruding towards the battery unit in a position opposite to the battery unit under the first coupling section and in a position opposite to the battery unit under the second coupling section.

Preferably, the first bracket may be elastically supported onto the vehicle body by using a first bushing making up each of the first and second coupling sections, and may elastically support the power unit by using a second bushing making up each of the inner coupling sections.

In the electric vehicle thus constructed, if an impact load is applied from the first side of the vehicle body due to a collision with the first side, and the first bracket is broken at the first fragile portion as described above, the bracket portion remaining on the vehicle-body side is not only short in entire length but also free to move because of the first bushing. For that reason, if the bracket portion remaining on the vehicle-body side contacts the battery unit, the bracket portion moves away from the battery unit. It is thus possible to avoid a destructive collision between the broken portion of the bracket portion remaining on the vehicle-body side and the battery unit.

More preferably, a lower end of each of the first bushings may be located higher than a position at a given distance away in a downward direction from an upper face of the battery unit adjacent to the lower end.

Preferably, the first bracket may have flexure-restraining means for restraining a flexure of the second bushing only when an impact load is entered from the first side.

More concretely, the flexure-restraining means may be made up of a flexure-restraining member that allows the flexure of the second bushing when an impact load is entered from the second side, and suppresses the flexure of the second bushing by contacting both the power unit and the first bracket as a rigid body when an impact load is entered from the first side.

More specifically, the plurality of brackets may include not only the first bracket but also a second bracket that supports an end of the power unit opposite to the battery unit. Preferably, in this case, the second bracket may be provided with a second fragile portion that is broken earlier than the first fragile portion at the time of collision with the first side, and is broken by an impact load at a lower limit value that is higher than a lower limit value of an impact load high enough to break the first fragile portion at the time of collision with the second side.

In the electric vehicle thus constructed, the second fragile portion of the second bracket has a property of being broken by an impact load applied from the first side more easily than the first fragile portion if the impact load is applied from the first side of the vehicle body due to a collision with the first side where the power unit is installed. First of all, therefore, the impact load applied from the first side breaks the second fragile portion of the second bracket. The power unit is thus brought into a one-side supported state where only the battery-unit side thereof is supported by the vehicle body. In result, the opposite end of the power unit to the battery unit descends due to the weight of the power unit. The first fragile portion is subsequently broken, which is provided with a property of being the most easily broken next to the second fragile portion by an impact load applied from the first side of the vehicle body. Accordingly, the power unit is detached away from the vehicle body, remaining in an inclined position. Since the power unit is in the inclined position, even if the power unit moves to reach the battery unit, the power unit slides onto the upper face of the battery unit and keeps moving. The power unit is thus prevented from destructively colliding with the battery unit.

The first and second fragile portions are provided with a property of being not easily broken by an impact load applied from the second side of the vehicle body when the impact load is applied from the second side of the vehicle body due to a collision with the second side where the power unit is not installed. For that reason, not only the first bracket but also the second bracket is not easily broken, and displacement of the power unit towards the battery unit can be restrained. Furthermore, if an excessive impact load is applied from the second side of the vehicle body, the first fragile portion that is more easily broken than the second fragile portion is broken to release impact energy, and the displacement of the power unit towards the battery unit is restrained simply by the support of the second bracket.

In either case of an impact on the side where the power unit is installed or an impact on the side where the power unit is not installed, damage of the battery unit is more reliably restrained.

More concretely, the second bracket may be made up of an arm member extending in the longitudinal direction of the vehicle body. In this case, the second fragile portion may be formed so that a third coupling section that couples the arm member to the power unit is offset with a fourth coupling section that couples the arm member to the vehicle body in the width direction of the vehicle.

Preferably, the second bracket may be coupled to the vehicle body by using a third bushing.

Alternatively, in order to achieve the above-mentioned object, the electric vehicle of the invention comprises a power unit that is disposed on a first side of a vehicle body, which is one end side of the vehicle as considered in a longitudinal direction of the vehicle, and drives the vehicle; a battery unit that is disposed on a center side of the vehicle body as considered in the longitudinal direction of the vehicle, adjacently to the power unit, and serves as a power source of the vehicle, the electric vehicle further comprises a first bracket that supports a battery unit-side end of the power unit onto the vehicle body; a first fragile portion that is formed in the first bracket and is formed to be broken by a smaller impact load at the time of collision with the first side than at the time of collision with a second side that is opposite to the first side as considered in the longitudinal direction of the vehicle; a second bracket that fixes onto the vehicle body an end of the power unit, which is opposite to the battery unit; and a second fragile portion that is formed in the second bracket, broken earlier than the first fragile portion at the time of collision with the first side, and broken by an impact load at a lower limit value that is higher than a lower limit value of an impact load high enough to break the first fragile portion at the time of collision with the second side.

Let us assume that, in the electric vehicle thus constructed, an impact load is applied on the first side of the vehicle body due to a collision with the first side where the power unit is installed. In this case, the second fragile portion of the second bracket is provided with a property of being more easily broken by an impact load applied from the first side of the vehicle body as compared with the first fragile portion. In this case, first of all, the impact load applied from the first side breaks the second fragile portion of the second bracket. The power unit is thus brought into a one-side supported state where only the battery-unit side thereof is supported by the vehicle body. In result, the opposite end of the power unit to the battery unit descends due to the weight of the power unit. Subsequently, the first fragile portion is broken, which is provided with a property of being most easily broken next to the second fragile portion by an impact load applied from the first side of the vehicle body. The power unit is thus detached away from the vehicle body, remaining in an inclined position. Since the power unit is in such an inclined position, even if the power unit moves to reach the battery unit, the power unit slides onto the upper face of the battery unit and keeps moving. The power unit is thus prevented from destructively colliding with the battery unit.

Let us assume that an impact load is applied from the second side of the vehicle body due to a collision with the second side where the power unit is not installed. In this case, the first and second fragile portions are provided with a property of being not easily broken by an impact load applied from the second side. For that reason, the first and second brackets are not easily broken, and displacement of the power unit towards the battery unit can be restrained. Furthermore, if an excessive impact load is applied from the second side of the vehicle body, the first fragile portion that is more easily broken than the second fragile portion is broken to release impact energy, and the displacement of the power unit towards the battery unit is restrained simply by the support of the second bracket.

In each case of a collision with the side where power unit is installed or a collision with the side where the power unit is not installed, damage of the battery unit can be restrained.

To be specific, the first bracket may be formed to extend in a width direction of the vehicle. In this case, the first fragile portion may be a recessed area that is formed in a lateral face of the first bracket, which faces towards the power unit, so as to expand in a vertical direction.

Preferably, the first fragile portion may be formed between a coupling section that couples the power unit to the first bracket and a coupling section that couples the first bracket to the vehicle body.

More concretely, the second bracket may be made up of an arm member extending in the longitudinal direction of the vehicle body. Preferably, in this case, the second fragile portion may be formed by offsetting in the vehicle width direction the coupling section that couples the arm member to the power unit with the coupling section that couples the arm member to the vehicle body.

BRIEF DESCRIPTION OF THE DRAWINGS

FIG. 17 is a schematic lateral view for explaining the behavior of the power unit at the time of collision with the second side where the power unit is not installed;

BEST MODE OF CARRYING OUT THE INVENTION

An electric vehicle according to one embodiment of the present invention will be described below in details with reference to FIGS. 1 to 19.

Figure 1:
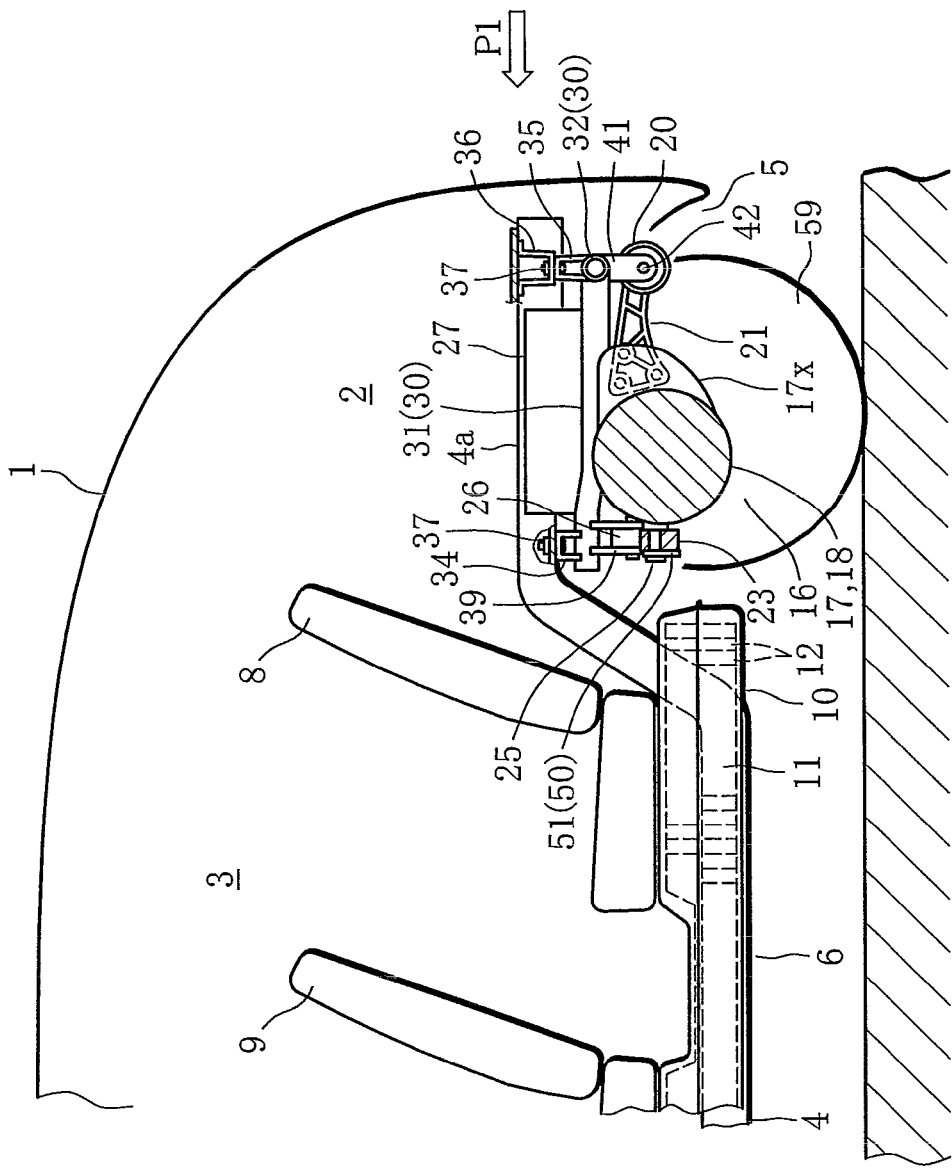
FIG. 1 is a longitudinal sectional view showing a schematic construction of a rear-portion side of an electric vehicle, where a power unit and a battery unit are installed, according to one embodiment of the invention.
Figure 2:
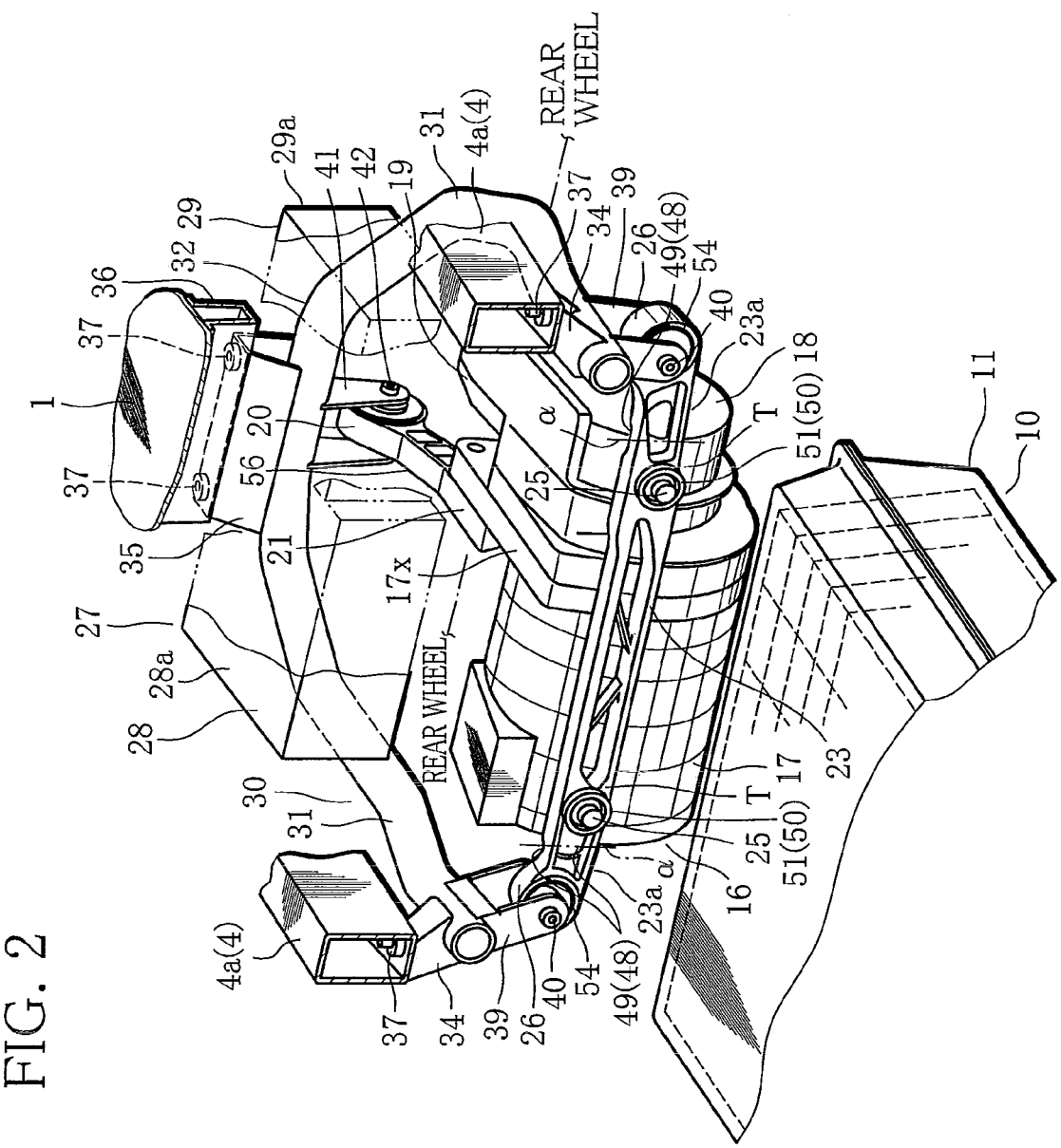
FIG. 2 is a perspective view showing a construction of a substantial part for mounting the power unit on a vehicle body.

FIG. 1 is a longitudinal sectional view showing a schematic construction of a rear-portion side of the electric vehicle. In FIG. 1, reference mark 1 represents a vehicle body. The vehicle body 1 has a luggage compartment 2 in a backmost region as considered in a longitudinal direction, and also has a passenger compartment 3 in a central region as considered in a longitudinal direction. Reference mark 4 denotes a pair of side frames placed in a lower face of the vehicle body 1. The side frames 4 make up the frame of the vehicle body 1. As shown in FIG. 2, the two side frames 4 are arranged parallel to each other with a given space therebetween in a width direction of the vehicle. The side frames 4 extend in a longitudinal direction of the vehicle, running under a floor of the passenger compartment 3 and also under a floor of the luggage compartment 2, which is set higher than the floor of the passenger compartment 3. Reference mark 4a in FIG. 1 represents a rear part of the side frame 4 which is extending under the luggage compartment 2.

There is a power unit room 5 that is a space formed under the floor of the luggage compartment 2 to be located on the backmost-portion side of the vehicle body (first side that is one end side as considered in the longitudinal direction of the vehicle). A battery unit accommodation chamber 6 is a space located on a center side as considered in the longitudinal direction of the vehicle body and surrounded by the two side frames 4 under the floor of the passenger compartment 3. More specifically, as illustrated in FIG. 1, the battery unit accommodation chamber 6 is formed of a flat space between the side frames 4, which expands below a rear sheet 8 placed on a rear side of the passenger compartment 3 and a front sheet 9 placed on a front side of the passenger compartment 3. In short, the power unit room 5 and the battery unit accommodation chamber 6 are arranged adjacent to each other as considered in the longitudinal direction of the vehicle.

A battery unit 10 is accommodated in the battery unit accommodation chamber 6 so as to occupy the space in the battery unit accommodation chamber 6. The battery unit 10 is a power source for the electric vehicle. The battery unit 10 has a box-shaped construction in which a large number of battery modules 12 are contained in a box-shaped container 11. The battery unit 10 includes a rear end facing onto the power unit room 5.

A power unit 16 is accommodated in the power unit room 5 as shown in FIG. 2 together with a control unit 27 that controls the power unit 16 and a mount frame 30 on which these units are mounted.

The construction of the power unit 16 will be more concretely described below. As illustrated in FIG. 2, an electric motor 17 and a reduction gear unit 18 are coupled together in the vehicle width direction, and a differential 19 is coupled to the reduction gear unit 18.

Figure 3:
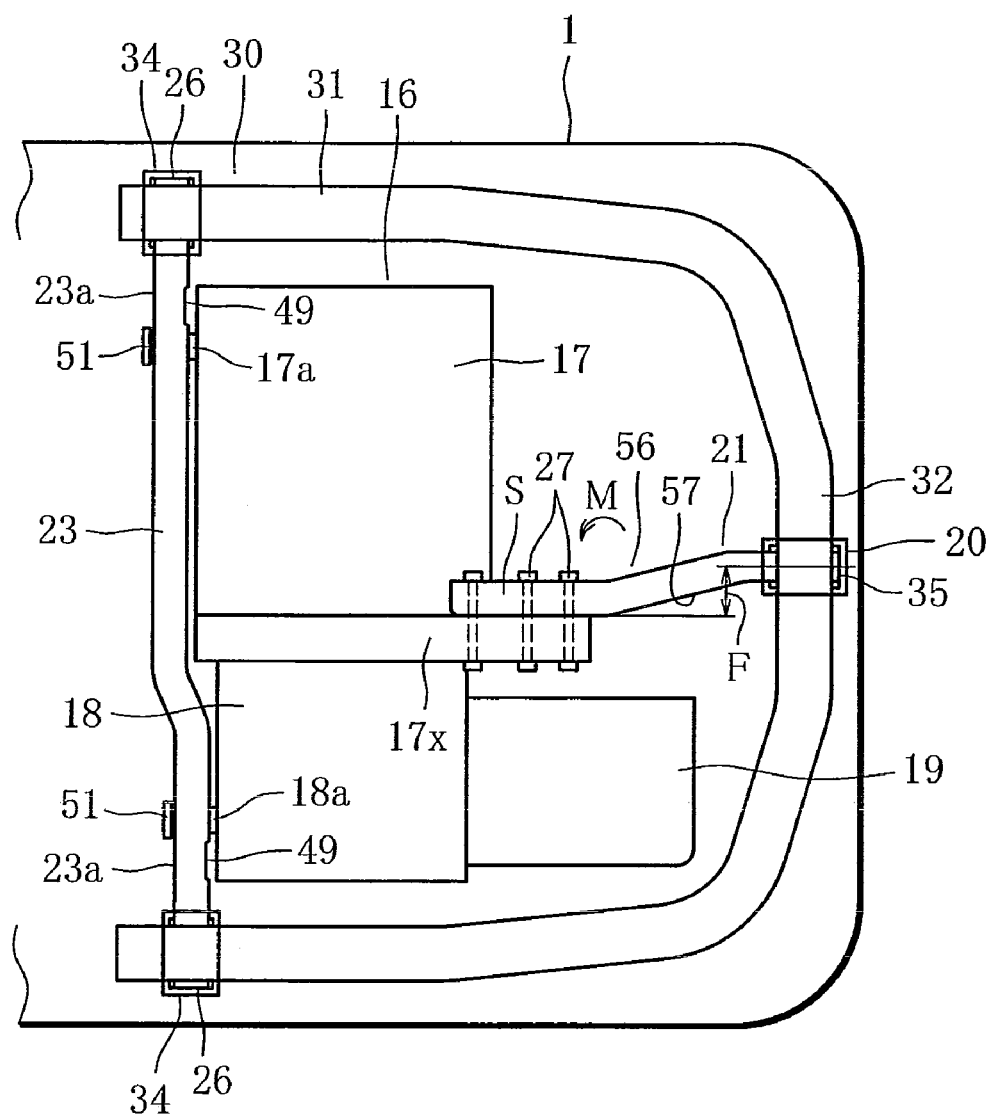
FIG. 3 is a schematic plan view showing a support construction that supports the power unit onto the vehicle body.
Figure 4:
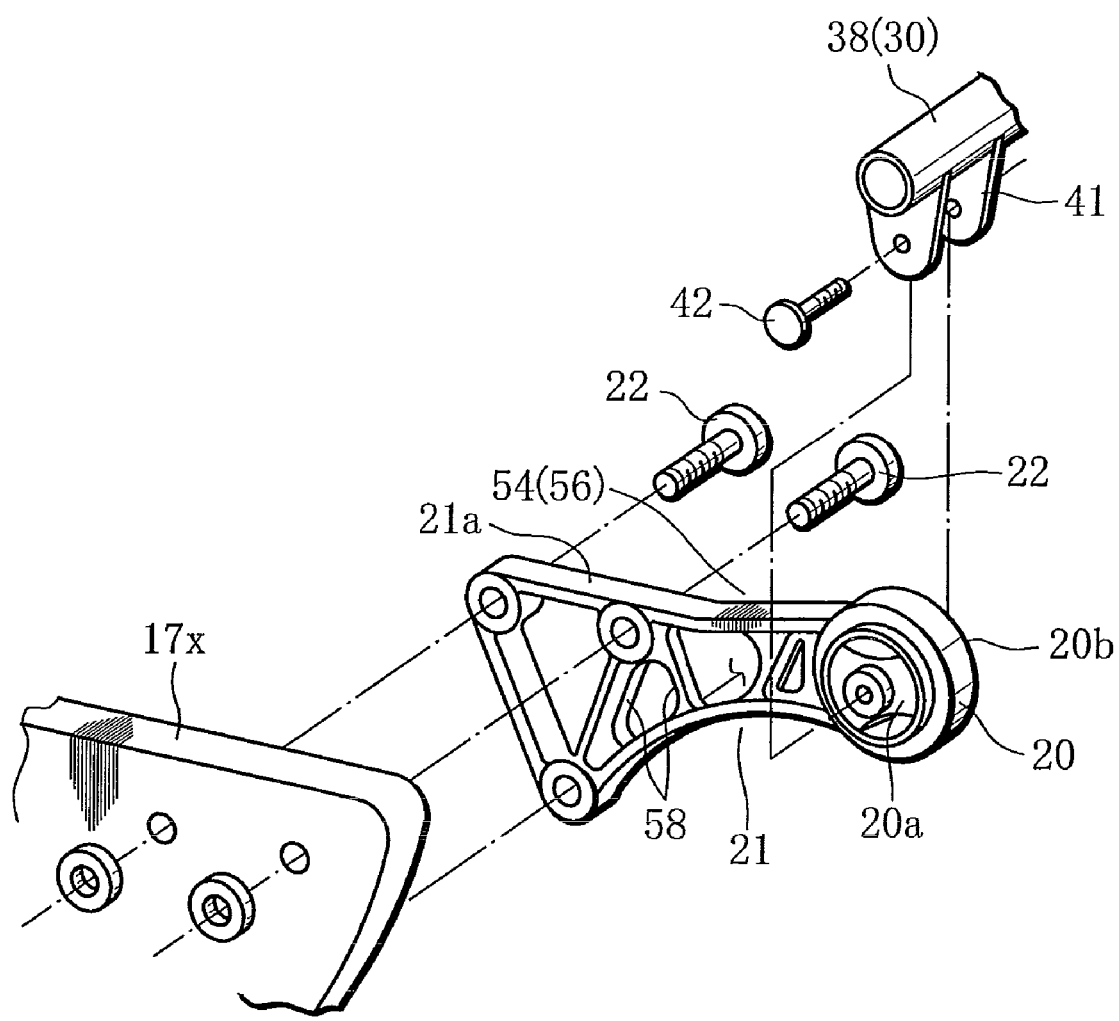
FIG. 4 is an exploded perspective view showing a rear bracket used in the support construction in FIG. 3 and the periphery of the rear bracket.

As illustrated in FIGS. 3 and 4, an arm-like rear bracket (second bracket) 21 is fixed to a support plate portion 17x protruding from the electric motor 17 toward the rear side of the vehicle body. The rear bracket 21 extends in a rearward direction. The rear bracket 21 is provided in a rear end thereof with a third bushing (fourth coupling section) 20. To be concrete, as illustrated in FIGS. 3 and 4, the third bushing 20 is made up of a circular frame portion 20b formed in the rear end of the rear bracket 21 and a cylindrical bushing member 20a that has been press-fit into the frame portion 20b. A base end portion formed in a front end of the rear bracket 21 is fastened to the support plate portion 17x with bolt-and-nuts 22. The third bushing 20 is protruding in the rear direction of the vehicle body.

Figure 5:
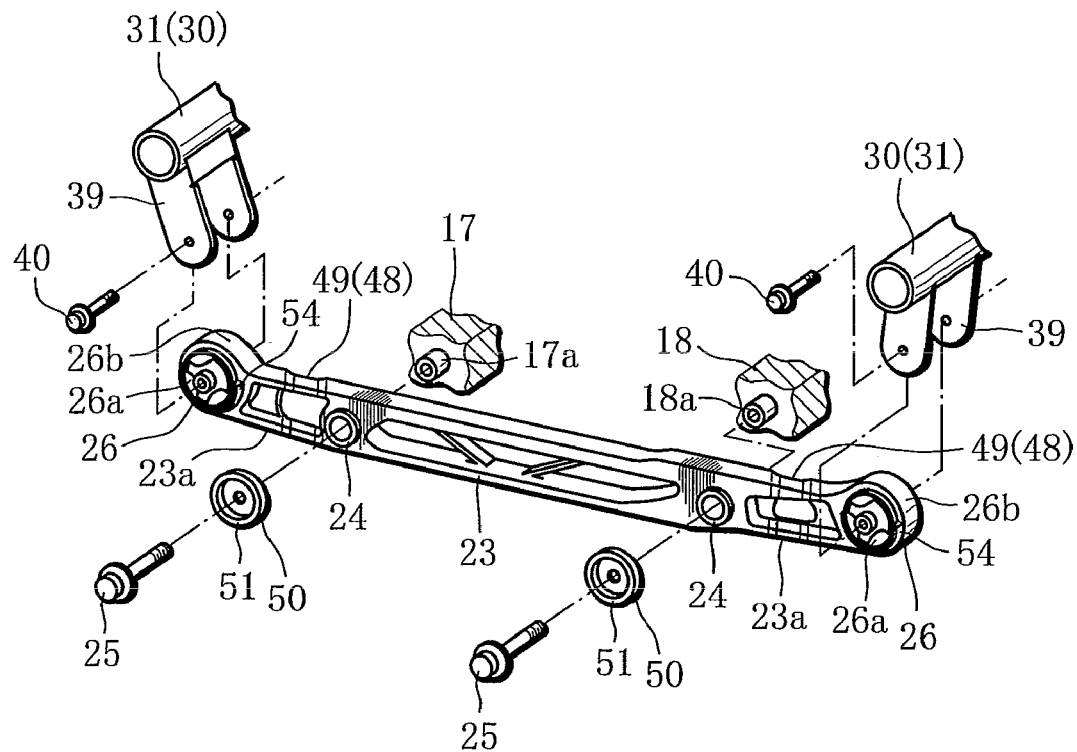
FIG. 5 is an exploded perspective view showing a front bracket that supports a battery unit-side end of the power unit and the periphery of the front bracket.

In front of the electric motor 17 and the reduction gear unit 18, there is a front bracket (first bracket) 23 extending in the vehicle width direction. To be specific, as illustrated in FIGS. 2, 3 and 5, the front bracket 23 is formed of an arm member that extends in the vehicle width direction, passing through a region along a front end of the horizontal electric motor 17 and that of the reduction gear unit 18, that is, a battery unit-side end of the power unit 16. Short cylindrical second bushings 24 are press-fit into two places in a more internal portion than both ends of the arm member, and thus construct a coupling section (inner coupling section) for coupling to the power unit 16. The second bushing 24 is fixed with bolts 25 to a support seat 17a formed on a casing portion of the electric motor 17 and a support seat 18a formed on a casing portion of the reduction gear unit 18. The power unit 16 is thus elastically supported by the arm member. Both ends of the arm member are protruding from both lateral ends of the power unit 16 in the vehicle width direction. First bushings (first and second coupling sections) 26 are set in the ends of the arm member. Similarly to the rear bracket 21, the first bushings 26 are also made up of circular frame portions 26b formed in the ends of the arm member and cylindrical bushing members 26a that have been press-fit into the frame portions 26b.

The control unit 27 includes an inverter device 28a, a controller 28, a DC/DC converter 29a, and a charger 29 as shown in FIG. 2. The inverter device 28a has a function of varying the power supply frequency of the electric motor 17. The controller 28 controls the inverter device 28a according to operating conditions of the vehicle.

A mount frame 30 is a member making up a part of the vehicle body 1. As illustrated in FIGS. 2 and 3, the mount frame 30 is formed in a substantial U-shape having a pair of side frame portions 31 extending parallel to each other in the rearward direction of the vehicle body 1 and a rear frame portion 32 jointing rear ends of the side frame portions 31 to each other. The pair of side frame portions 31 extends in the longitudinal direction of the vehicle body 1, running close to the end of the electric motor 17 and that of the reduction gear unit 18. The rear frame portion 32 extends in the vehicle width direction, passing behind the power unit 16. The mount frame 30 includes a front mounting seat 34 at the end of each of the side frame portions 31, and also includes a rear mounting seat 35 in the rear frame portion 32. As illustrated in FIGS. 2 and 3, the mount frame 30 is fastened with bolt-and-nuts 37 to lower parts of the rear portions 4a of the side frames 4 and a lower part of a cross member 36 situated between the rear portions 4a, through the front mounting seats 34 and the rear mounting seat 35. The rear portions 4a of the side frames 4 and the cross member 36 form a frame of the power unit room 5.

As shown in FIGS. 1 and 2, a control unit 27 is mounted on an upper portion of the mount frame 30, namely, the side frame portions 31 and the rear frame portion 32, which is suspended by the frame of the power unit room 5 as described above.

The power unit 16 is suspended by the side frame portions 31 and the rear frame portion 32 in the following manner. The front bracket 23 and the rear bracket 21 are coupled to the power unit 16 in the above-described manner. As illustrated in FIGS. 2 and 5, the first bushings 26 of the front bracket 23 are supported with bolt-and-nuts 40 onto the pair of mount brackets 39 fixed to the side frame portions 31. The third bushing 20 of the rear bracket 21 is supported with a bolt-and-nut 42 to the mount bracket 41 fixed to the center of the rear frame portion 32 as illustrated in FIGS. 2 and 4. Since the front bracket 23 and the rear bracket 21 are thus supported onto the mount frame 30, the power unit 16 is suspended by the mount frame 30.

In other words, parts of the power unit 16, such as the battery unit-side end of the power unit 16 and the opposite-side end thereof, are elastically supported onto the vehicle body 1 by using the brackets 23 and 21 having the first bushings 26, the second bushings 24, and the third bushing 20. Since there is obtained a double vibration-proof structure by employing the second bushings 24, high-frequency vibrations generated by the electric motor 17 are prevented from being transmitted to the vehicle body 1.

The front bracket 23 is designed to the battery unit 17 from being damaged in either case of a collision with the first side of the vehicle body 1, where the power unit 16 is installed, as considered in the vehicle longitudinal direction (collision with the rear part in the embodiment), or a collision with the opposite second side where the power unit 16 is not installed (collision with the front part in the embodiment).

Specifically, as illustrated in FIGS. 2, 3 and 5, the front bracket 23 is provided with first a fragile portion 48 having different breakage properties between at the time of collision with the first side and at the time of collision with the second side. The rear bracket 21 is provided with a second fragile portion 56 having different breakage properties between at the time of collision with the first side and at the time of collision with the second side, as illustrated in FIGS. 2, 3 and 4.

The first fragile portion 48 will be described below in more details. The first fragile portion 48 is formed in a bracket portion 23a between one of the two first bushings 26 (first coupling section) and the second bushing 24 closest to this first bushing (first coupling section) 26, and another bracket portion 23a between the other one of the two first bushings 26 (second coupling section) and the second bushing 24 closest to the first bushing (second coupling section) 26, that is, positions shown by dashed lines a in FIG. 2.

The first fragile portions 48 both have a property of being broken when applied with an impact load exceeding a given level. To be concrete, the first fragile portions 48 are easily broken from an impact load that is entered from the first side, or the rear part, of the vehicle body 1 at the time of collision with the first side where the power unit 16 is installed. On the other hand, the first fragile portions 48 are not easily broken from an impact load that is entered from the second side, or the front part, of the vehicle body 1 at the time of collision with the second side where the power unit 16 is not installed. To be more concrete, in each of the first fragile portions 48, there is formed a recessed area extending in a vertical direction, for example, a groove-shaped recessed area 49, in a lateral face of the corresponding bracket portion 23a, which faces the power unit 16 as shown in FIGS. 3 to 6.

If the vertical recessed areas 49 opening toward the power unit 16 are formed in the bracket portions 23a as described above, the front bracket 23 offers the following properties.

In case of collision with the first side where the power unit 16 is installed (collision with the rear part), the vehicle body 1 is forcibly displaced by impact from the collision, and bending stress is then applied in a direction of expanding the openings of the groove-shaped recessed areas 49. In result, the bracket portions 23a are easily broken at the recessed areas 49. In case of collision from the second side where the power unit 16 is not installed (collision with the front part), the power unit 16 is forcibly displaced due to the collision, and bending stress is then applied in a direction of narrowing the opening of the groove-shaped recessed area 48. In result, the recessed area 49 is not easily broken. Assuming that an impact load that is entered from the first side, or the rear part, of the vehicle body 1 is an impact load P1, and that an impact load that is entered from the second side, or the front part, of the vehicle body 1 is an impact load P2, such a difference causes breakage in the front bracket 23 due to the impact load P1 that is much smaller than the impact load P2 at the time of collision with the first side. On the other hand, at the time of collision with the second side, even the large impact load P2 does not break the front bracket 23. Needless to say, the recessed area 49 may be a simple dent having a shape other than a groove as long as it is possible to control breakage in the above-mentioned manner.

Because of the foregoing difference in breakage property, the front bracket 23 is broken, leaving a part of the bracket portion 23a having a short entire length attached to a mount bushing 26 at the time of collision with the first side (collision with the rear part) where the power unit 16 is installed. In this way, the part of the bracket portion 23a, which has been released from the support of the power unit 16, and the mount bushing 26 are displaced, avoiding the battery unit 10. At the time of collision with the second side (collision with the front part) where the power unit 16 is not installed, the power unit 16 is made hard to displace towards the battery unit 10 by restraining the breakage of the front bracket 23 as much as possible.

Figure 6:
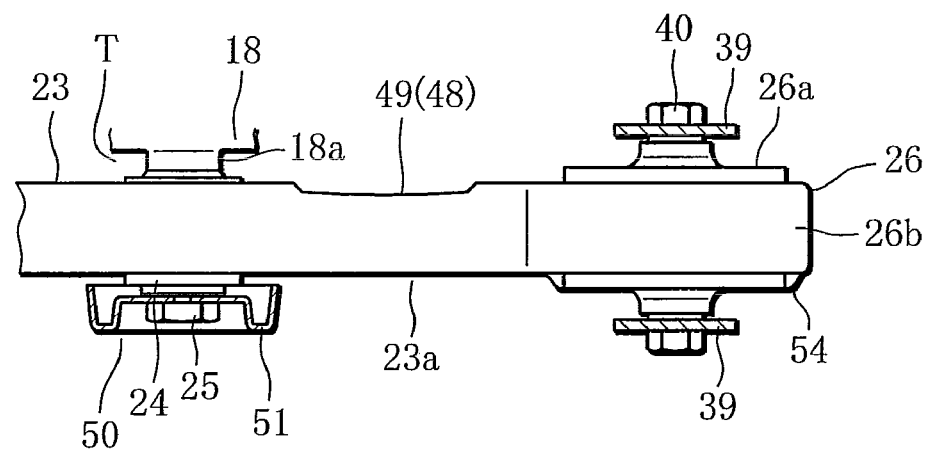
FIG. 6 is a plan view showing a region of the front bracket in FIG. 5, which expands from a first bushing to a coupling section of the power unit.

At the time of collision with the first side (collision with the rear part) where the power unit 16 is installed, flexure of the second bushings 24 hampers the breakage of the front bracket 23. In order to solve this problem, the front bracket 23 is provided with flexure controllers (flexure control means) 50 that restrain the flexure of the second bushings 24 as shown in FIGS. 2, 3, 5 and 6. As stated above, the power unit 16 is supported onto the front bracket 23 with the bolts 25. Each of the flexure controllers 50 is constructed by attaching a circular washer (flexure-restraining member) 51 to between a head of the corresponding bolt 25, which is protruding toward the battery unit 10, and the end of the corresponding second bushing 24 as shown in FIGS. 5 and 6. The washer 51 is a substantial rigid body, and has a larger external diameter than the second bushing 24.

Figure 13:
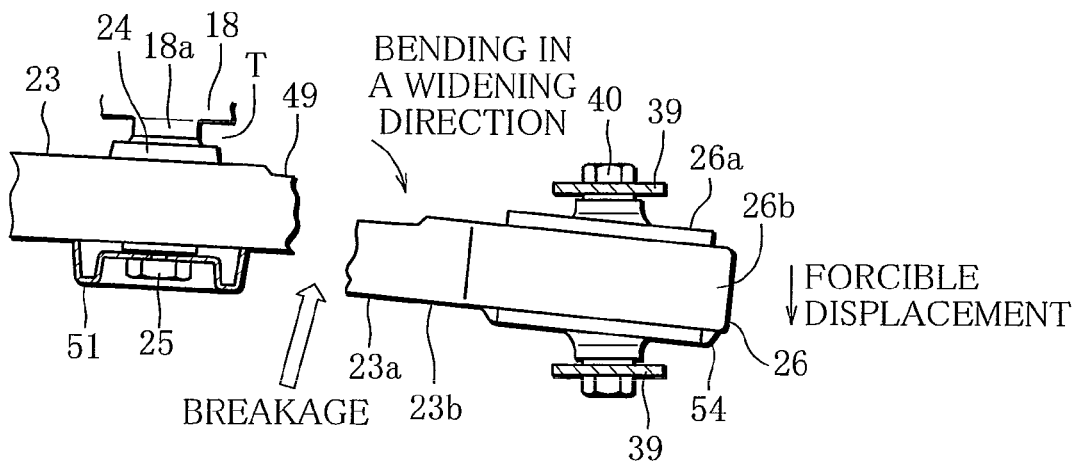
FIG. 13 is a plan view showing a broken first fragile portion of the front bracket in the state shown in FIG. 12.

As shown by a solid line in FIG. 6, the washer 51 is usually kept away from the front bracket 23. As illustrated in FIG. 13, when the impact load P1 is entered from the rear part (first side where the power unit 16 is installed) of the vehicle body, and the second bushing 24 is flexured, an outer circumferential end of the washer 51 and a lateral portion of the front bracket 23 hit against each other. This restrains the second bushing 24 from being further flexured. To the contrary, flexure is allowed to freely generate when the impact load P2 is entered from the front part (second side where the power unit 16 is not installed) of the vehicle body. Accordingly, only if an impact load is entered from the first side due to a collision with the first side where the power unit 16 is installed, the washer 51 that is a rigid body is brought into contact to the power unit 16 and the front bracket 23, to thereby restrain the flexure of the busing 24 for mounting the power unit. Consequently, the impact load P1 is concentrated at the recessed area 49. The breakage of the front bracket 23 is controlled by the flexure restraint so that the front bracket 23 is properly broken during a period when the front bracket 23 is displaced and reaches the battery unit 10.

Since the washer 51 is disposed on a battery unit 10-side face of the front bracket 23, there is obtained a construction in which the elasticity of the second bushings 24 is made ineffective at the time of collision with the rear part, but is not made ineffective at the time of collision with the front part. This makes it possible to properly control the breakage of the front bracket 23 in each of collision modes including the situation of collision with the rear part and with the front part.

Figure 7:
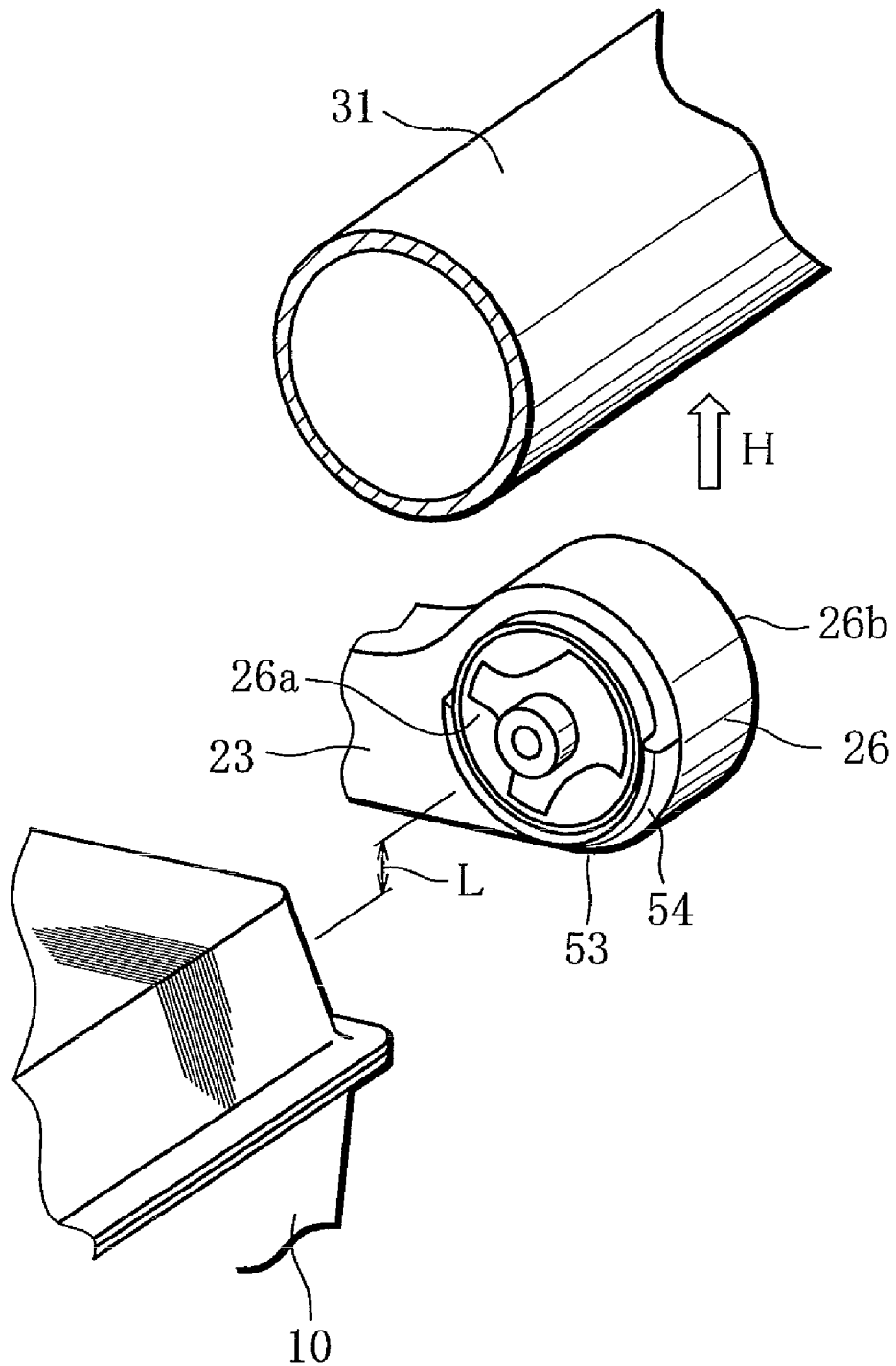
FIG. 7 is a perspective view showing a disposition of the first bushing.

As illustrated in FIG. 7, the first bushings 26 are positioned as close as possible to the side frame portions 31 of the mount frame 30 as shown by arrow H, that is, to the side frame 4, so that the first bushings 26 may easily slide onto the battery unit 10. Concretely, a lower end of each of the first bushings 26 is located at a given distance away by length L in a downward direction from the upper face of the battery unit 10. It is designed that the first bushings 26 easily slide onto the battery unit 10 by setting the length L at as small a value as possible which is equal to or less than a given value.

As illustrated in FIGS. 2, 5, 6 and 7, a sloping portion 53 is formed in the end of the front bracket 23 under the vicinity of each of the first bushings 26 in order to make the first bushings 26 slide easily onto the battery unit 10. To be specific, the sloping portion 53 is made up of an arc-shaped projecting portion 54 protruding from the frame portion 26*b* that contains the bushing member 26*a* towards the battery unit 10 as illustrated in FIG. 7. The projecting portion 54 is formed in an end face of the frame portion 26*b* opposite to the battery unit 10 to be located in a region overlapping the end of the battery unit 10 when viewing in a vertical direction. When the first bushings 26 are displaced in a collision to contact the battery unit 10, the projecting portions 54 contact the battery unit 10 before the first bushings 26, and smoothly tilt the first bushings 26 and the frame portions 26*b* forwards. Consequently, the first bushings 26 and the frame portions 26*b* easily slide onto the battery unit 10.

As illustrated in FIGS. 2, 3 and 4, the rear bracket 21 is provided with the second fragile portion 56 between a mount portion (third coupling section) S (shown only in FIG. 3) that is coupled to the power unit 16 and the third bushing (fourth coupling section) 20. The second fragile portion 56 is constructed of an offset portion 57 that is formed by obliquely bending a middle portion of the rear bracket 21 as illustrated in FIG. 3. The position of the mount portion S coupled to the power unit 16 and the position of the mount bushing 20 are offset, for example, in a vehicle width direction. With such a construction, when an impact load is entered from the first side of the vehicle body 1 due to a collision with the first side where the power unit 16 is installed, a great bending moment is created in the offset portion 57 by a forcible displacement of the vehicle body 1. Consequently, the breakage of the rear bracket 21 is smoothly progressed. To the contrary, when an impact load is entered from the second side of the vehicle body 1 due to a collision with the second side where the power unit 16 is not installed, the offset portion 57 is deformed in an expanding direction by a forcible displacement of the power unit 16, so that the rear bracket 21 will not be broken easily. In other words, the rear bracket 21 also has a breakage property of being easily broken by collision with the first side where the power unit 16 is installed, and of being not easily broken by collision with the second side where the power unit 16 is not installed. Numeral mark F in FIG. 3 denotes an offset amount of the offset portion 57.

In order to secure a desired breakage property and required rigidity strength, the rear bracket 21 has a construction the rigidity strength of which is easy to change. Specifically, as illustrated in FIG. 4, the rear bracket 21 is made up of a rim-shaped frame 21*a*. The mount portion S and the third bushing 20 are offset in the vehicle width direction by inclining a middle portion of the frame 21*a* in the vehicle width direction, and various types of ribs 58 are added to the frame 21*a*. Due to such a construction, portions in which the mount portion S, to which the power unit 16 is coupled, and the third bushing 20 are located have a high rigidity strength, and the middle portion has a low rigidity strength.

Because of the construction of the rear bracket 21 and the setting of the offset portion 57, the second fragile portion 56 has a breakage property of being broken earlier than the first fragile portion 48 in the front bracket 23 if an impact load is entered from the first side of the vehicle body 1 due to a collision with the first side where the power unit 16 is installed. To the contrary, when an impact load is entered from the second side of the vehicle body 1 due to a collision with the second side where the power unit 16 is not installed, the second fragile portion 56 shows a breakage property of being not broken by an impact load equal to or smaller than a minimum impact load that can break the first fragile portion 40, that is, a breakage property of being less easily broken than the first fragile portion 40.

Since there are provided the first fragile portion 48 and the second fragile portion 56, damage of the battery unit 10 is restrained at the time of collision with the first side where the power unit 16 is installed and with the second side where the power unit 16 is not installed.

Numeral mark 59 shown in FIGS. 1, 10, 11 and 17 represents a rear wheel that is connected to a differential 19 through a shaft, not shown.

Behavior of an electric vehicle in a collision will be described below with reference to FIGS. 8 to 19.

For example, let us assume that a vehicle collides with the rear end of the electric vehicle in a parked position from the back of the electric vehicle (collision from the first side where the power unit 16 is installed, that is, collision with the rear part).

During this collision with the rear part, the impact load P1 exceeding the given level is entered into the electric vehicle from the first side where the power unit 16 is installed, as shown by arrow in FIG. 1. The impact load P1 is entered to a mount bracket 41 and the rear end of the side frame 4, which are located on the rear side closely to a collision point.

The vehicle body 1 is forcibly displaced forward by impact of the collision with the rear part. At the same time, an impact force that acts to displace the power unit 16 in the forward direction is also applied through the brackets 21 and 23 to the power unit 16 that tends to stay due to inertia thereof.

Figure 8:
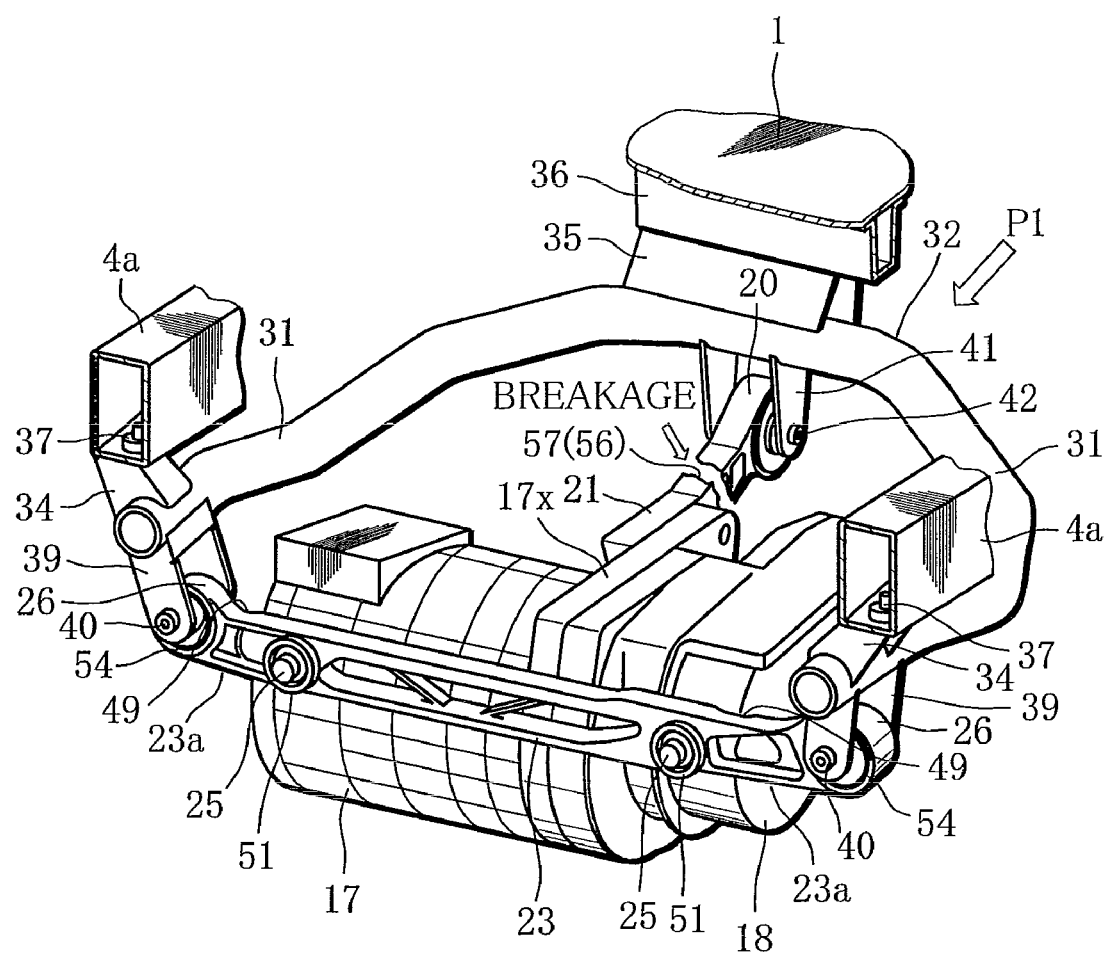
FIG. 8 is a perspective view showing a state in which the rear bracket is broken by an impact load at the time of collision with the first side where the power unit is installed.
Figure 9:
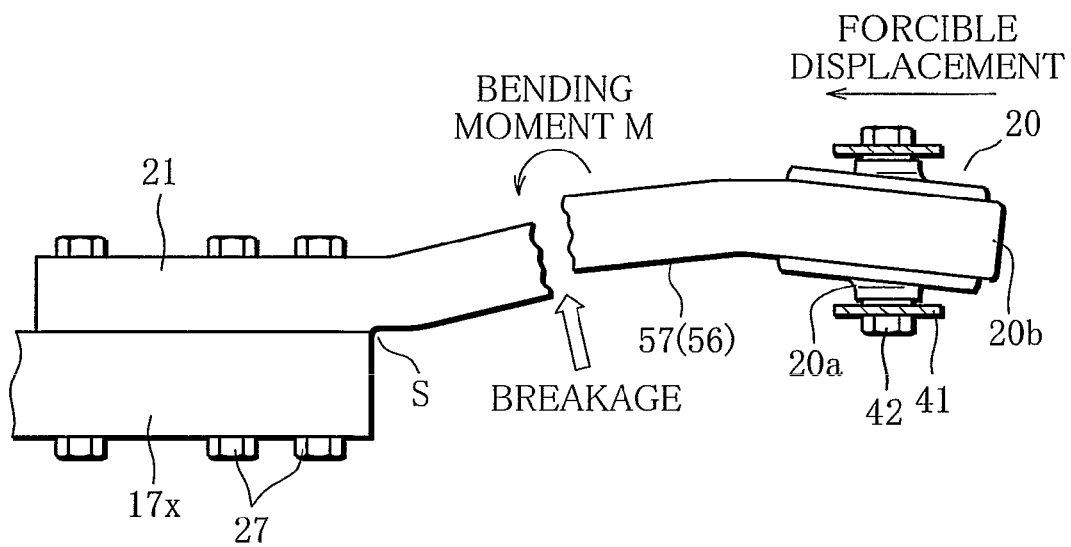
FIG. 9 is a plan view showing the broken rear bracket in the state shown in FIG. 8.
Figure 10:
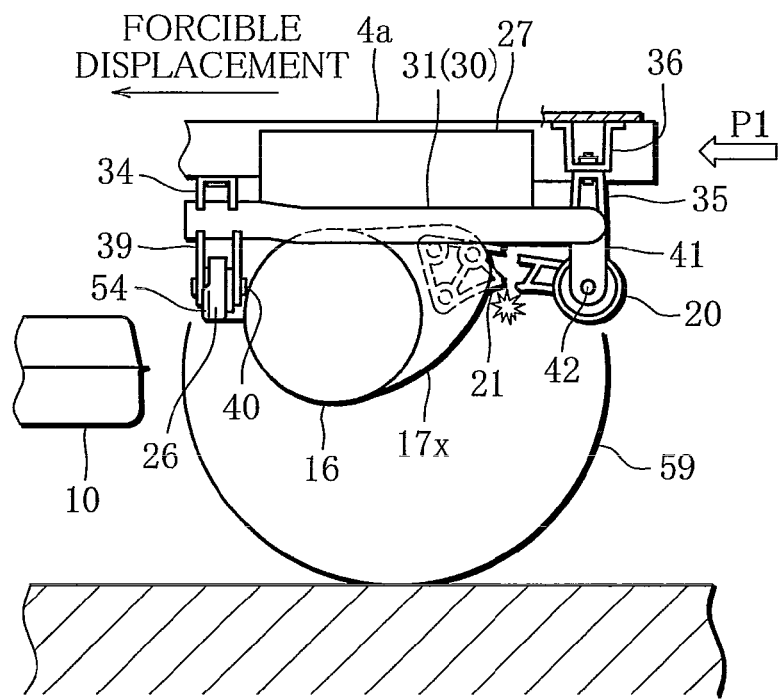
FIG. 10 is a schematic lateral view showing the state shown in FIG. 8 together with peripheral devices and members.

The recessed area 49 and the offset portion 57 are formed in the rear bracket 21 and the front bracket 23 as fragile portions. In this case, the offset portion 57 is provided with a property of being most easily broken by the impact load entered from the rear part of the vehicle body 1. As illustrated in FIGS. 8 to 10, the offset portion 57 is broken by bending moment M (shown in FIG. 9) that is created by the impact load P1 that has been entered. In short, a collision with the rear part causes the behavior in which the rear bracket 21 is first broken in the offset portion 57.

Figure 11:
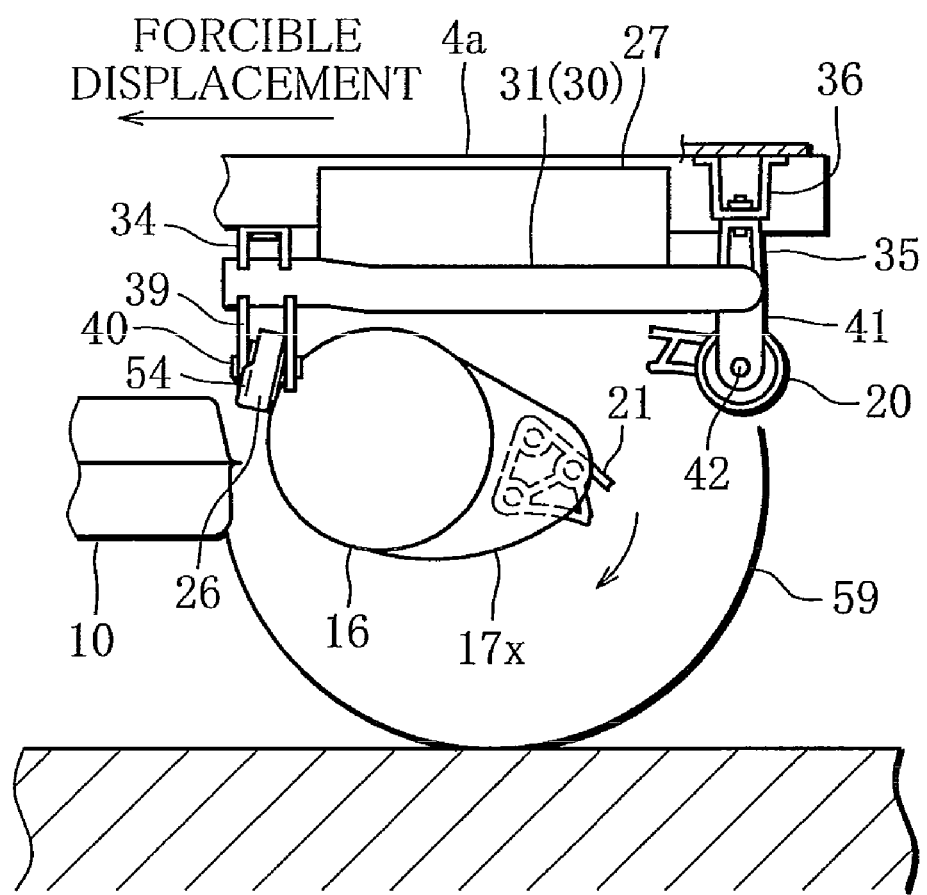
FIG. 11 is a schematic lateral view showing a state in which the position of the power unit is changed from the one shown in FIG. 10.

In result, the power unit 16 is not anymore supported at the rear side thereof as considered in the longitudinal direction of the vehicle body, and is brought into a state supported only at the front side thereof. As illustrated in FIG. 11, due to the weight of the power unit 16, the rear side of the power unit 16 is lowered with the front side used as a fulcrum. The power unit 16 is consequently in an inclined position where the rear side thereof is lowered.

At this point of time, due to the impact load P1 that has been entered, the side frame 4 and the mount frame 30 are forcibly displaced in the forward direction as shown by arrow in FIG. 10, leaving the power unit 16 that tends to stay because of inertia. In the front bracket 23, there generates a bending stress created by behavior of the first bushing 26 that is forcibly displaced together with the side frame 4 and the power unit 16 that tends to stay.

Figure 12:
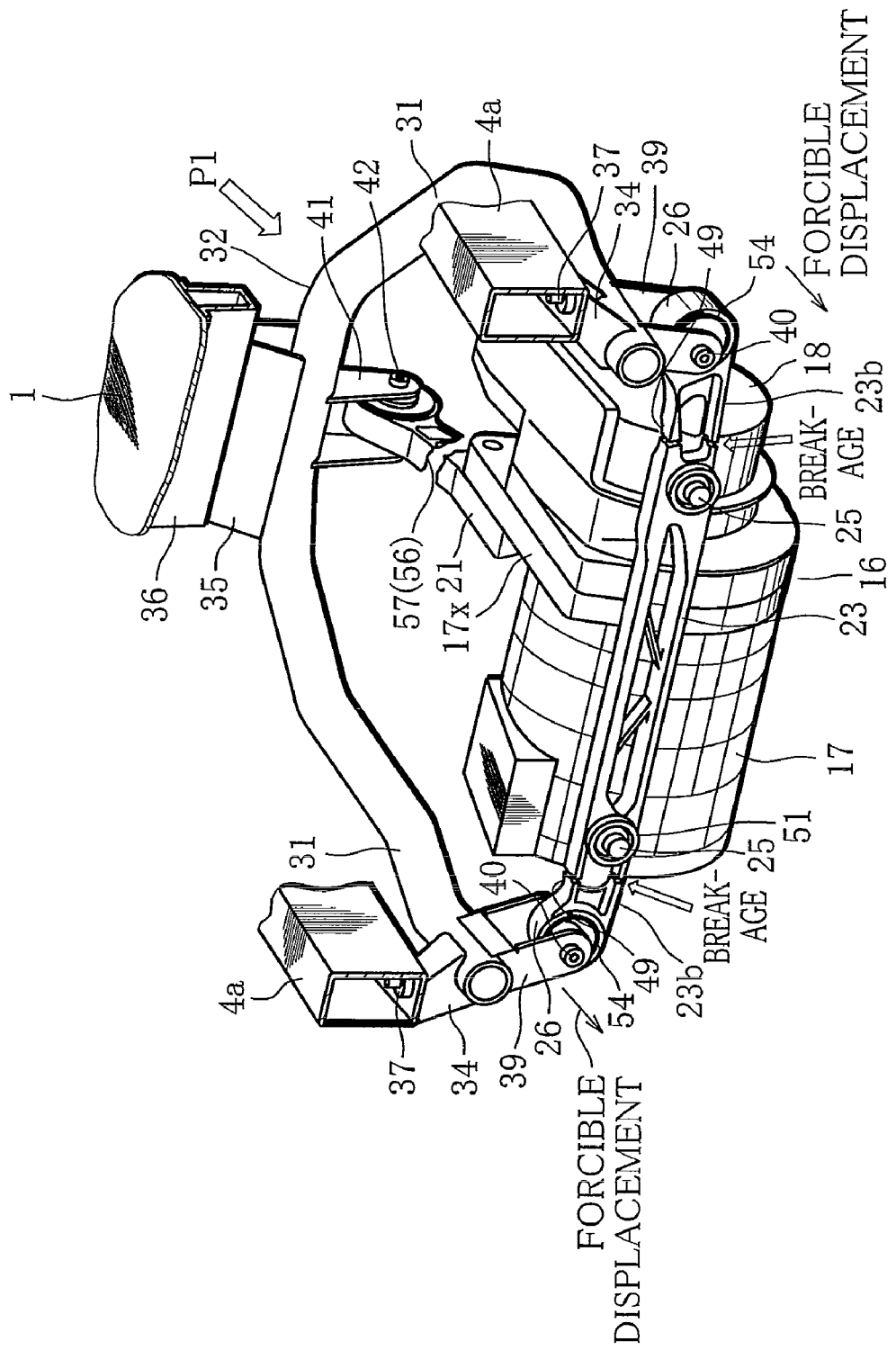
FIG. 12 is a perspective view showing a state in which the front bracket is broken after the rear bracket is broken at the time of collision with the first side where the power unit is installed.
Figure 14:
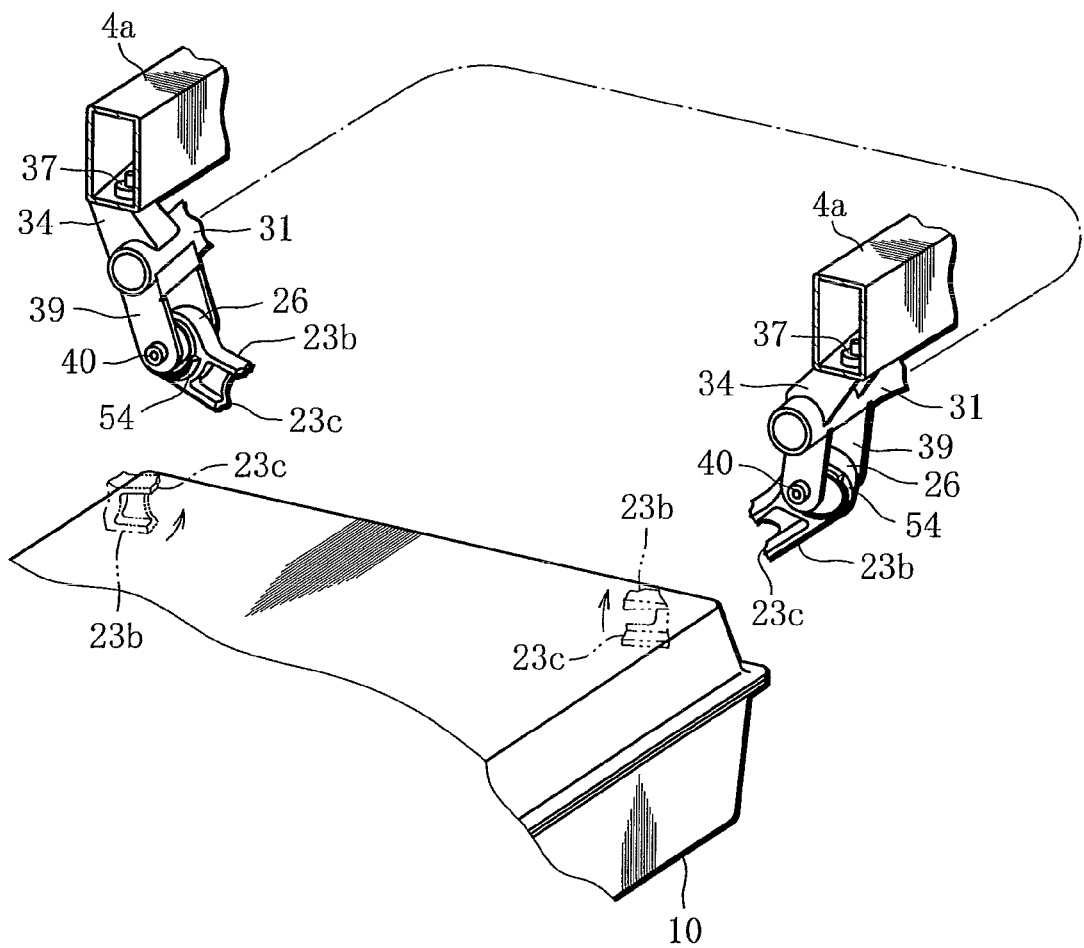
FIG. 14 is a perspective view of a substantial part, showing a bracket portion remaining in the first bushing after the breakage of the front bracket at the time of collision with the first side.

As illustrated in FIG. 6, the first fragile portion, or the recessed area 49, identifying a breakage position is formed in the bracket portion 23a located between the second bushing 24 and the first bushing 26. The recessed area 49 is formed to face in such a direction as to be easily broken by the bending moment produced in this time point. When the front bracket 23 is displaced as a result of the forcible displacement of the side frame 4 and the mount frame 30, the front bracket 23 and the washer 51 hit against each other, which restrains the flexure of the second bushing 24. The impact load P1 is therefore efficiently transmitted to the recessed area 49, so that stress is concentrated at the recessed area 49, and the recessed area 49 is deformed in such a direction that the opening thereof is widened as illustrated in FIG. 13. Since breakage of the recessed area 49 is easily caused by such a bending deformation in the direction of widening the opening, the bracket portion 23a is broken at once in the recessed area 49. The front bracket 23 is consequently divided into three, including middle, right and left portions as illustrated in FIG. 12. This breakage detaches the power unit 16 away from the vehicle body 1. As illustrated in FIG. 14, the first bushing 26 and the bracket portion 23b that has been broken are left on the side of vehicle body 1 that is being forcibly displaced.

The bracket portion 23b left on the first bushing 26-side is short in entire length, and is released from the support of the power unit 16 to become free to move as illustrated in FIG. 14. For example, as shown by chain double-dashed line in FIG. 14, when displaced towards the battery unit 10, the bracket portion 23b slides onto the upper face of the battery unit 10 or, although not shown, deviates to the side of the battery unit 10. This makes it possible to avoid a destructive collision between the bracket portion 23b that has been broken or a broken part 23c of the bracket portion 23b, which has a sharp tip end, and the battery unit 10.

The first bushing 26 itself is released from the support of the power unit 16 to become free to move, so that it is possible to avoid a destructive collision between the first bushing 26 and the battery unit 10. The behavior of the first bushing 26 in this process will be described below with reference to FIGS. 15A to 15C.

Figure 15A:
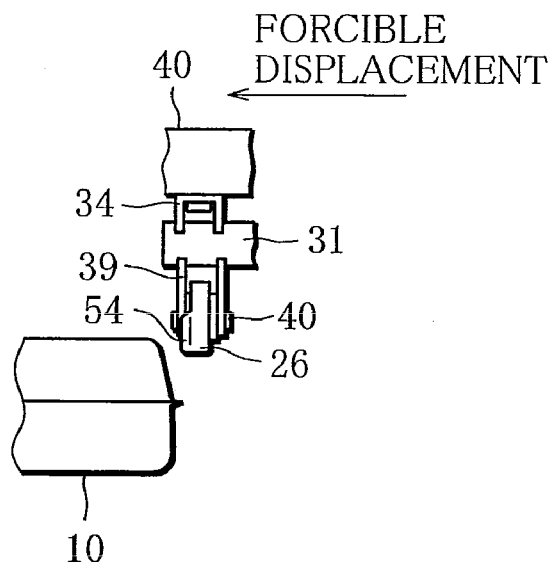
FIG. 15A is a schematic lateral view showing a state in which the first bushing approaches the battery unit after the front bracket is broken at the time of collision with the first side.
Figure 15B:
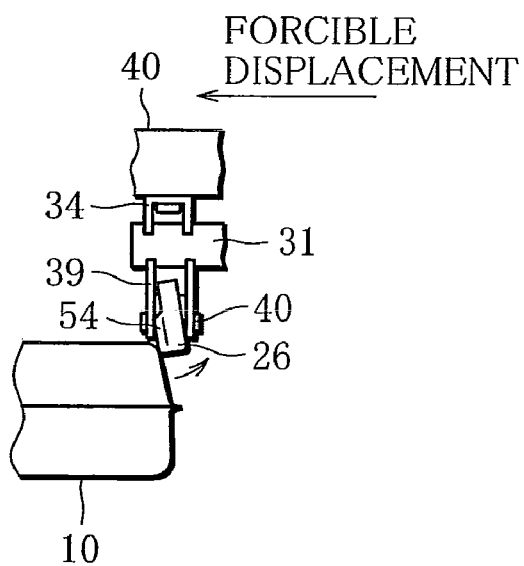
FIG. 15B is a schematic lateral view showing a state in which the first bushing has been brought into contact with the battery unit, following the state shown in FIG. 15A.
Figure 15C:
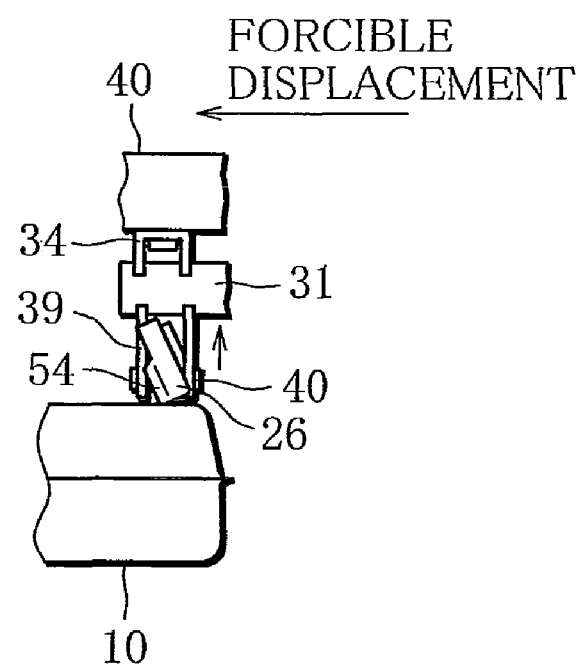
FIG. 15C is a schematic lateral view showing a state in which the first bushing has slid onto an upper face of the battery unit, following the state shown in FIG. 15B.

If the first bushing 26 that has become free to move approaches the end of the battery unit 10 as a result of the forcible displacement of the side frame 4 as illustrated in FIG. 15A, the projecting portion 54 located in a lower portion of the frame portion 26b (lower than a bolt-inserting position) contacts an upper part of the end of the battery unit 10 as illustrated in FIG. 15B. The first bushing 26 is inclined by being pushed by the battery unit 10. The first bushing 26 is then pulled up from the end of the battery unit 10 onto the upper face of the battery unit 10. Pulled up in this manner, the first bushing 26 slides onto the upper face of the battery unit 10 in the inclined position as illustrated in FIG. 15C, to thereby avoid a destructive collision between the first bushing 26 and the battery unit 10.

Figure 16A:
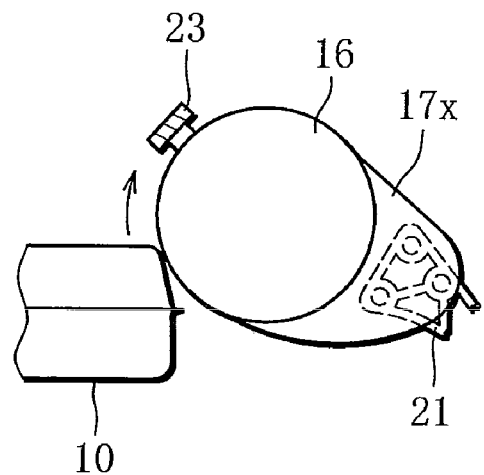
FIG. 16A is a schematic lateral view showing a state in which the power unit has been brought into contact with the battery unit, following the breakage of the front bracket, at the time of collision with the first side.
Figure 16B:
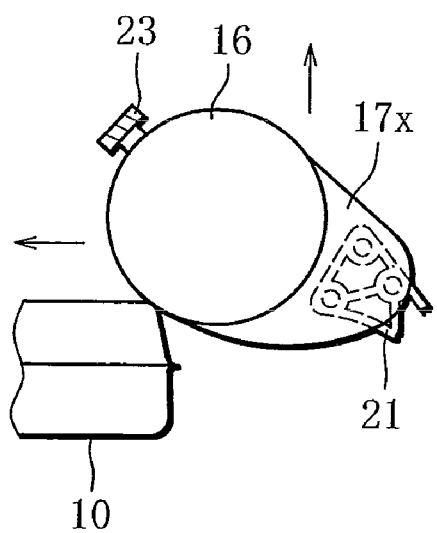
FIG. 16B is a schematic lateral view showing a state in which the power unit has slid onto the battery unit, following the state shown in FIG. 16A.

As illustrated in FIG. 16A, the power unit 16 detached away from the vehicle body 1 is displaced towards the battery unit 10, remaining in a backward inclined position that makes it easy to slide onto the battery unit 10, that is, a position in which the battery-unit side (front side) is higher than the opposite side (rear side). The inclined lower face of the power unit 16 then contacts the upper part of the end of the battery unit 10 as illustrated in FIG. 16A. This makes the power unit 16 move upwards. The power unit 16 is thus displaced to slide onto the upper face of the battery unit 10 as illustrated in FIG. 16B, thereby avoiding a destructive collision between the power unit 16 and the battery unit 10.

In this manner, the power unit 16 and the battery unit 10 are restrained from hitting against each other in the event of a collision with the first side where the power unit 16 is installed. It is also possible to prevent the bracket portion 23b that has been broken, the sharp broken part 23c, which is produced in the tip end of the bracket portion 23b, and the mount bushings 26 from destructively hitting against the battery unit 10.

Contrary to the above-described collision, for example, if the front part of the moving electric vehicle collides with an object in front (collision from the second side where the power unit 16 is not installed, that is, a collision with the front part), a collision between the power unit 16 and the battery unit 10 is restrained by the recessed area 49 and the offset portion 57. The behavior of the electric vehicle during the collision with the front part will be described below.

At the time of collision with the front part, the impact load P2 exceeding the given level is entered into the electric vehicle from the second side where the power unit 16 is not installed, as shown by arrow in FIG. 17. The power unit 16 is then forcibly displaced towards the battery unit 10 due to the inertia of the power unit 16 as shown by arrow in FIG. 17.

Figure 18:
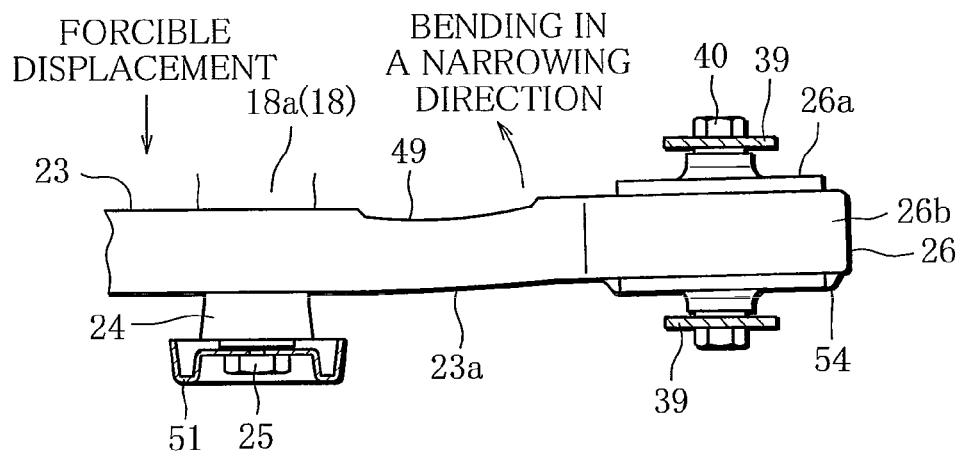
FIG. 18 is a plan view for explaining the behavior of the fragile portions of the front bracket at the time of collision with the second side.
Figure 19:
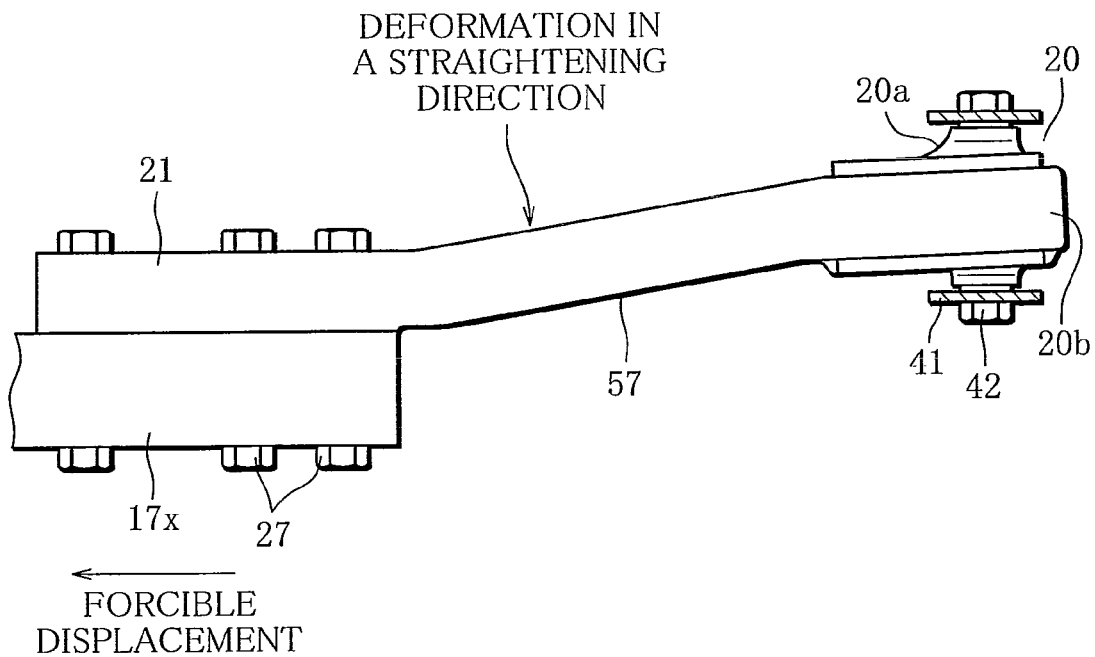
FIG. 19 is a plan view for explaining how the rear bracket operates at the time of collision with the second side.

In the rear bracket 21 and the front bracket 23, there are formed the recessed area 49 and the offset portion 57 as fragile portions. The recessed area 49 is formed to face in such a direction as not to be easily broken by the impact load entered from the front part of the vehicle body 1. Compared to the recessed area 49, the offset portion 57 is less easily broken by the impact load acting in a pulling direction. As illustrated in FIG. 18, even if the power unit 16 hits against the front bracket 23 as a result of the forcible displacement of the power unit 16, and the impact load P2 is applied to the recessed area 49, the recessed area 49 is merely deformed in a direction of narrowing the opening thereof and is not broken. As illustrated in FIG. 19, the offset portion 57 is pulled and merely deformed in a direction of being straightened, and is not easily broken. Such behavior restrains the power unit 16 from being displaced towards the battery unit 10.

As described above, when the impact load P1 is entered into the vehicle body 1 due to a collision with the rear part, the washer 51 blocks the displacement of the second bushing 24. However, when the impact load P2 is entered into the vehicle body 1 due to a collision with the front part as stated above, the washer 51 does not block the displacement of the second bushing 24. Accordingly, the load that is transmitted from the power unit 16 to the front bracket 23 can be reduced by the second bushing 51. It is also possible to delay the transmission of the load to the front bracket 23.

When the excessively large impact load P2 is entered into the vehicle body 1, the front bracket 23 is broken at the recessed area 49, and thereafter, the offset portion 57 of the rear bracket 23 is broken. Such behavior restrains the power unit 16 from being displaced towards the battery unit 10 as much as possible.

In the case of collision with the second side where the power unit 16 is not installed, the power unit 16 and the battery unit 10 are restrained from hitting against each other as described above.

According to the electric vehicle of the present embodiment, because of the differentiation of breakage properties of the first fragile portion 48, which corresponds to a colliding direction in the vehicle longitudinal direction, damage of the battery unit 10 is restrained by the movement of the power unit 16 in either case of a collision with the first side where the power unit 16 is installed or a collision with the second side where the power unit 16 is not installed.

The first fragile portion 48 is formed between the second busing 24, which functions as the coupling section (third coupling section) through which the power unit 16 is coupled to the front bracket 23, and the mount bushings 26, which functions as the coupling sections (first and second coupling sections) that are coupled to the vehicle body 1. The bracket portion 23b that has been broken is therefore short in entire length and is released from the support of the power unit 16. This makes it easy to avoid a collision between the broken part 23c of the bracket portion 23b, which has the sharp tip end, and the battery unit 16. In addition, the battery unit 16 is prevented from being damaged by the broken part 23c.

Such an advantage is offered by the electric vehicle having the battery unit 10 and the power unit 16 that are arranged alongside of each other in the vehicle longitudinal direction. The advantage is very effective especially in the electric vehicle in which there is no large space between the battery unit 10 and the power unit 16.

Furthermore, the construction of the first fragile portion 48 is very simple since the necessary breakage property can be obtained only by forming the recessed area 49 in the power unit-side lateral face of the front bracket 23.

Additionally, since the flexure of the second bushing 24 is restrained by the washer 51 at the time of collision from the first side where the power unit is installed, it is possible to break the front bracket 23 without an influence of elasticity of the second bushings 24 before the front bracket 23 reaches the battery unit 10. The flexure restraint can be achieved only by utilizing the washer 51, so that the construction is very simple.

Attached onto the battery unit-side lateral face of the front bracket 23, the washer 51 does not block the effect of elasticity of the second bushing 24, which delays the load being applied to the front bracket 23.

The first bushing 26 has such a structure that vertical dimension of a part thereof which is located lower than the upper face of the battery unit 10 is as small as possible. This makes it easy to cause the first bushing 26 to slide onto the upper face of the battery unit 10 at the time of collision from the first side where the power unit 16 is installed. Moreover, the projecting portion 54 projecting towards the battery unit 10 is formed under the first bushing 26. This makes it easier to make the first bushing 26 slide onto the upper face of the battery unit 10.

In addition, the rear bracket 21 has the offset portion 57 (second fragile portion 56) whose breakage property is differentiated from the recessed area 49 of the front bracket 23. Accordingly, in consort with the recessed area 49 (first fragile portion 48), the offset portion 57 of the rear bracket 21 causes behavior of the power unit 16, in which the power unit 16 can adequately escape from the battery unit 10 at the time of collision with the first side where the power unit 16 is installed. The offset portion 57 of the rear bracket 21 causes behavior of the power unit 16, in which it is more difficult for the power unit 16 to hit against the battery unit 10 in a collision with the second side where the power unit 16 is not installed. Damage of the battery unit 10 can be therefore restrained with more reliability.

The invention is not limited to the embodiment described above. Various modifications can be made without deviating from the spirit of the invention. For example, the embodiment shows an example of the electric vehicle in which the power unit is installed on the rear end side of the vehicle body, and the battery unit on the center side. However, the disposition of the power and battery units is not limited to the one mentioned above. For example, the invention may be applied to an electric vehicle in which a power unit is installed on the front end side of a vehicle body, and a battery unit on the center side.

The embodiment may be improved in safety by providing the battery unit with a reinforcing member, such as a metal plate, on the side where the power unit is installed.

The invention claimed is:

1. An electric vehicle comprising:
    a power unit that is disposed on a first side of a vehicle body, which is one end side of the vehicle as considered in a longitudinal direction of the vehicle, supported onto the vehicle body by using a plurality of brackets, and drives the vehicle; and
    a battery unit that is disposed on a center side of the vehicle body as considered in the longitudinal direction of the vehicle, adjacently to the power unit, and serves as a power source of the vehicle, wherein
    the plurality of brackets includes a first bracket that supports a battery unit-side end of the power unit;
    the first bracket extends in a width direction of the vehicle, and is coupled to the vehicle body through a first coupling section arranged to one end of the first bracket and a second coupling section arranged to the other end of the first bracket;
    the power unit is coupled to the first bracket through at least two inner coupling sections that are located more inside than the first and second coupling sections as considered in the width direction of the vehicle;
    the first bracket has a first fragile portion, which is broken by being applied with an impact load exceeding a given level at the time of collision in the longitudinal direction of the vehicle, between the first coupling section and the inner coupling section closest to the first coupling section, and between the second coupling section and the inner coupling section closest to the second coupling section; and
    the first fragile portion is formed to be broken by a smaller impact load at the time of collision with the first side than at the time of collision with a second side that is opposite to the first side as considered in the longitudinal direction of the vehicle.

2. The electric vehicle according to claim 1, wherein the first fragile portion is a recessed area formed in a lateral face of the first bracket, which faces towards the power unit, so as to expand in a vertical direction.

3. The electric vehicle according to claim 1, wherein the first bracket has a projecting portion protruding towards the battery unit in a position opposite to the battery unit under the first coupling section and in a position opposite to the battery unit under the second coupling section.

4. The electric vehicle according to claim 1, wherein the first bracket is elastically supported onto the vehicle body by using a first bushing making up each of the first and second coupling sections, and elastically supports the power unit by using a second bushing making up each of the inner coupling sections.

5. The electric vehicle according to claim 4, wherein a lower end of each of the first bushings is located higher than a position at a given distance away in a downward direction from an upper face of the battery unit adjacent to the lower end.

6. The electric vehicle according to claim 4, wherein the first bracket has flexure-restraining means for restraining a flexure of the second bushing only when an impact load is entered from the first side.

7. The electric vehicle according to claim 6, wherein the flexure-restraining means is made up of a flexure-restraining member that allows the flexure of the second bushing when an impact load is entered from the second side, and suppresses the flexure of the second bushing by contacting both the power unit and the first bracket as a rigid body when an impact load is entered from the first side.

8. The electric vehicle according to claim 1, wherein
the plurality of brackets includes not only the first bracket but also a second bracket that supports an end of the power unit opposite to the battery unit; and
the second bracket is provided with a second fragile portion that is broken earlier than the first fragile portion at the time of collision with the first side, and is broken by an impact load at a lower limit value that is higher than a lower limit value of an impact load high enough to break the first fragile portion at the time of collision with the second side.

9. The electric vehicle according to claim 8, wherein
the second bracket is made up of an arm member extending in the longitudinal direction of the vehicle body; and
the second fragile portion is formed so that a third coupling section that couples the arm member to the power unit is offset with a fourth coupling section that couples the arm member to the vehicle body in the width direction of the vehicle.

10. The electric vehicle according to claim 8, wherein the second bracket is coupled to the vehicle body by using a third bushing.

11. An electric vehicle comprising:
a power unit that is disposed on a first side of a vehicle body, which is one end side of the vehicle as considered in a longitudinal direction of the vehicle, and drives the vehicle;
a battery unit that is disposed on a center side of the vehicle body as considered in the longitudinal direction of the vehicle, adjacently to the power unit, and serves as a power source of the vehicle, wherein the electric vehicle further comprises:
a first bracket that supports a battery unit-side end of the power unit onto the vehicle body;
a first fragile portion that is formed in the first bracket and is formed to be broken with a smaller impact load at the time of collision with the first side than at the time of collision with a second side that is opposite to the first side as considered in the longitudinal direction of the vehicle;
a second bracket that fixes onto the vehicle body an end of the power unit, which is opposite to the battery unit; and
a second fragile portion that is formed in the second bracket, broken earlier than the first fragile portion at the time of collision with the first side, and broken by an impact load at a lower limit value that is higher than a lower limit value of an impact load high enough to break the first fragile portion at the time of collision with the second side.

12. The electric vehicle according to claim 11, wherein
the first bracket is formed to extend in a width direction of the vehicle; and
the first fragile portion is a recessed area formed in a lateral face of the first bracket, which faces towards the power unit, so as to expand in a vertical direction.

13. The electric vehicle according to claim 11, wherein the first fragile portion is formed between a coupling section that couples the power unit to the first bracket and a coupling section that couples the first bracket to the vehicle body.

14. The electric vehicle according to claim 11, wherein
the second bracket is made up of an arm member extending in the longitudinal direction of the vehicle body; and
the second fragile portion is formed by offsetting in the vehicle width direction the coupling section that couples the arm member to the power unit with the coupling section that couples the arm member to the vehicle body.

* * * * *